United States Patent

Palmer et al.

[15] 3,705,355

[45] Dec. 5, 1972

[54] WIDE DYNAMIC RANGE PRODUCT DETECTOR

[72] Inventors: Fred Irwin Palmer, Moorestown; John Richard Foglebocn, Cherry Hill, both of N.J.

[73] Assignee: RCA Corporation

[22] Filed: Oct. 26, 1970

[21] Appl. No.: 83,857

[52] U.S. Cl. ....................325/450, 307/251

[51] Int. Cl. ....................H04b 1/26

[58] Field of Search ..............325/138, 450, 446, 451; 307/257, 251, 430

[56] References Cited

UNITED STATES PATENTS

| | | | |
|---|---|---|---|
| 3,229,230 | 1/1966 | Feldman | 325/138 |
| 3,205,457 | 9/1965 | Bell | 325/138 |
| 3,553,584 | 1/1971 | Walsh, Jr. | 325/446 |
| 3,510,781 | 5/1970 | Wollensen | 325/451 |
| 3,515,993 | 6/1970 | Merriam | 325/446 |
| 3,302,039 | 1/1967 | Baker | 307/257 |

*Primary Examiner*—Robert L. Griffin
*Assistant Examiner*—Barry Leibowitz
*Attorney*—Edward J. Norton

[57] ABSTRACT

A first signal, having at least one frequency tone, is applied in push-pull to a signal combiner. A second signal is also applied to the signal combiner. The product of the first and second signal at one phase forms a first signal component at a first signal combiner output terminal, a second signal component at the first output terminal being intermodulation products. The product of the first and second signal, 180° out of phase with respect to the first signal component at the first output terminal, forms a first signal component at a second signal combiner output terminal, a second signal component at the second output terminal being intermodulation products. The signals at the first and second signal combiner output terminals are filtered and passed through a difference circuit, the undesired intermodulation products being substantially reduced at the system output terminal.

6 Claims, 1 Drawing Figure

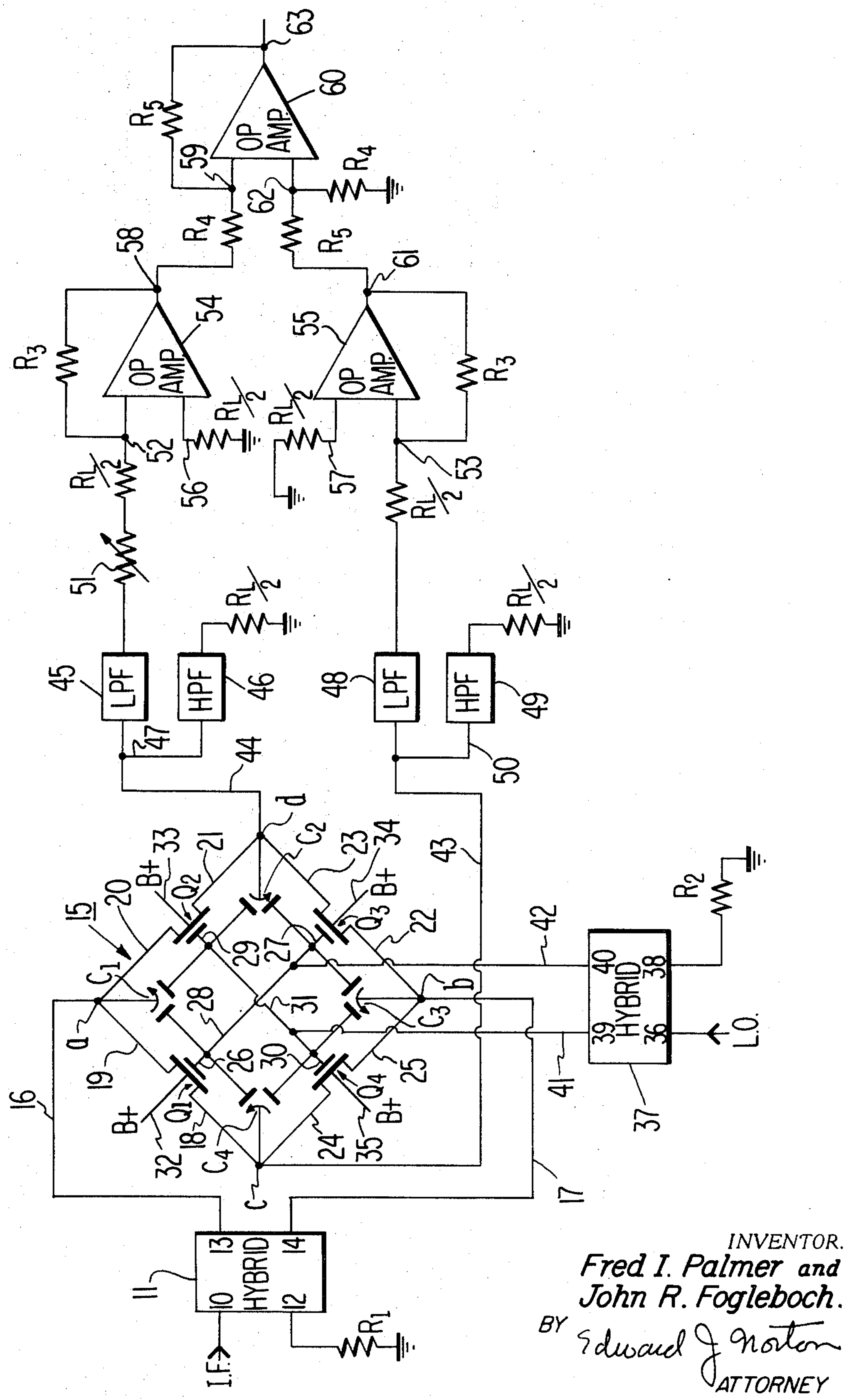
INVENTOR.
Fred I. Palmer and
John R. Fogleboch.
BY Edward J. Norton
ATTORNEY

WIDE DYNAMIC RANGE PRODUCT DETECTOR

The invention herein described was made in the course of or under a contract or subcontract thereunder with the Department of the Air Force.

This invention relates to signal processing equipment and more specifically to apparatus for the translation of an information signal from one frequency to another frequency while substantially minimizing undesired intermodulation products.

When an information signal, as for example an intermediate frequency signal, is to be translated to a lower frequency, such as a video frequency signal, the information signal is generally multiplied by another signal which has a frequency near the information signal frequency. The information signal may have one or more frequency tones carrying information.

Inherent in the multiplication process is the generation of undesired intermodulation products which tend to increase the noise in the frequency translating system thereby making the further processing of weak information bearing signals a difficult task. The signal processing problem is further compounded when the undesired intermodulation products are reflected back into the product generating device. The reflected signals tend to generate second order spurious intermodulation products which further increases the noise in the system and thereby limits the dynamic range over which detection of the desired product signal may be made.

The main approach developed in the prior art to overcome the problem of undesired intermodulation products has been to filter the signal generated by the signal multiplying circuit.

The filter approach has several drawbacks the most important drawback being that it is impractical in equipment, such as communications and radar receivers, which must operate over a wide bandwidth. In wide bandwidth receiver systems where no filtering is used, or where wide range filters are used, the undesired interfering signals or intermodulation products will appear at the amplifier stages. If an intermodulation product falls within the receiver frequency range and is larger in amplitude than the information bearing signal the communications channel will be effectively jammed. Intermodulation products may, therefore, limit the dynamic range of a receiver by either raising the system noise floor or by overriding a weak information signal.

In a typical intermediate frequency (I.F.) translating system one may have information contained in one or more frequency tones in the I.F. range, say $f_1$ and $f_2$. A local oscillator (L.O.) is generally provided and supplies a signal at a frequency $f_L$ which is in the same range of frequencies as $f_1$ and $f_2$. The desired output signals from such a system are signals at frequencies $f_1 - f_L$ and $f_2 - f_L$. However, the signal multiplication process inherently generates intermodulation products. Included in these intermodulation products are signals at frequencies $2f_1 - f_2 - f_L$, $2f_2 - f_1 - f_L$, $f_1 - f_2$, $f_1 + f_2 - 2f_L$, and $2f_1$.

The latter intermodulation products should be eliminated or reduced for the translating system to have a fairly wide dynamic range.

The present invention substantially reduces the effects of intermodulation products thereby providing a wide dynamic range signal translating system.

In accordance with the present invention a signal combining means, including a switching circuit, is provided. An input signal is applied in push-pull to the signal combining means and a switching signal is also applied thereto. In response to the input signal and to the switching signal, the signal combining means provides at a first output terminal a first signal having a first component and a second component. The first component is the product of the input signal and the switching signal at a certain phase, the second component being intermodulation products. A second signal having first and second components is provided at a second signal combining means output terminal. The first component of the second signal is the product of the input signal and the switching signal at a 180° phase angle with respect to the phase of the first component of the first signal. The second component of the second signal corresponds to the intermodulation products. First and second frequency selective means are provided to respectively pass signal components in a desired frequency range and absorb signal components in an undesired frequency range contained in the first and second signal. A difference circuit is connected to the first and second frequency selective means subtracting the output signals passed by the first and second frequency selective means. The subtraction process substantially reduces the intermodulation products appearing at the system output terminal, while providing the desired frequency translated signal.

In the sole FIGURE of the drawing, a block diagram of a preferred embodiment of the invention is shown.

In the preferred embodiment of the invention the frequency translating system processes an intermediate frequency (I.F.) signal, for example a signal at a frequency of 100kHz ± 2.5kHz. A switching signal or local oscillator (L.O.) signal is provided, in the given example, at a frequency of 100kHz. The desired information bearing signal has a frequency which is the difference between the I.F. and the L.O. frequencies. In the example given the desired frequency lies in the video range of frequencies.

DETAILED DESCRIPTION

Referring now to the block diagram shown in the sole figure, and in the context of the example previously given, the I.F. signal is applied to terminal 10 of a hybrid 11. The I.F. signal may be comprised of several information bearing tones in the I.F. range of frequencies. In the present example, the information is carried in signals having tone frequencies $f_1$ and $f_2$. Frequencies $f_1$ and $f_2$ are in the range of 100kHz ± 2.5 kHz.

The hybrid has a second input terminal 12 which is terminated in a resistor $R_1$. Hybrid 11 has two output terminals 13 and 14. Hybrid 11 is a commercially available device whose function is to split the input power coming into terminal 10 by ½ or 3db. One-half of the input power available at terminal 10 is provided at terminal 13. The other half of the power available at terminal 10 is provided at terminal 14. The signals at terminals 13 and 14 differ by 180° by virtue of the internal structure of hybrid 11.

The signals available at terminals 13 and 14 are provided to a signal combiner or mixer 15 via lines 16 and 17 respectively. The mixer 15 in the preferred embodiment is arranged in a quad configuration. The quad arrangement is much like a balanced bridge having four arms, each arm having identical elements therein. The quad arrangement also has four corners, two of which are utilized as input terminals, the other two corners being utilized as output terminals.

In the particular arrangement of quad mixer 15 corners *a* and *b* are utilized as the input terminals. Lines 16 and 17 are respectively connected to input terminals *a* and *b*. Corners *c* and *d* are utilized as the output terminals for the mixer 15.

Each arm of quad mixer 15 contains a field effect transistor (FET). FET $Q_1$ has its source electrode 18 connected to corner *c* and its drain electrode 19 connected to corner *a*. FET $Q_2$ has its source electrode 20 connected to corner *a* and its drain electrode 21 connected to corner *d*. FET $Q_3$ has its source electrode 22 connected to corner *b* and its drain electrode 23 connected to corner *d*. FET $Q_4$ has its source electrode 24 connected to corner *c* and its drain electrode 25 connected to corner *b*. FET $Q_1$ has its gate electrode 26 connected to the gate electrode 27 of $Q_3$ via line 28. Gate electrode 29 of FET $Q_2$ is connected to gate electrode 30 of FET $Q_4$ via line 31.

The quad mixer 15 is shown having one field effect transistor in each arm of the quad. In some applications it may be desirable to parallel two or more FET's in each arm of the quad arrangement. A bias voltage B+ is applied to the substrate electrodes 32, 33, 34, and 35 of FET's $Q_1$–$Q_4$, respectively. In the example presently under consideration the bias voltages are typically on the order of 25 volts dc. A bias voltage B+ is applied to the substrates of FET's $Q_1$–$Q_4$ for the purpose of raising the allowable voltage swing applied between the gate and source electrode of each of the devices as is known in the art.

The function of FET's $Q_1$–$Q_4$ is to provide a switch in each arm of the mixer 15. It is therefore evident that other types of devices may be utilized in the arms of the quad configuration without departing from the spirit or scope of the present invention. For example diodes or silicon controlled rectifiers may also be utilized. However it has been found that FET's are especially useful as switches in this application. The FET's go from a relatively low impedance to a relatively high impedance thereby approaching the function of an ideal switch.

The signals on line 16 are applied to the input terminal of mixer 15 at a certain phase angle. The signals one line 17 are applied to the input terminal *b* of mixer 15 with a phase difference of 180° with respect to the phase of the signals on line 16. The I.F. signal is therefore being applied to the mixer 15 in push-pull. Push-pull being defined as the application of two similar signals varying by 180° to two points in a circuit.

An L.O. signal is applied to input terminal 36 of a second hybrid 37. Input terminal 38 of hybrid 37 is terminated by a resistor $R_2$. The operation of hybrid 37 is identical to the operation of hybrid 11. The input power of the L.O. signal at terminal 36 is equally divided between output terminals 39 and 40 of hybrid 37. The signals appearing at terminals 39 and 40 vary in phase by 180° with respect to each other.

The signals appearing at terminal 39 are respectively coupled to the gate electrodes 29 and 30 of $Q_2$ and $Q_4$ via lines 41 and 31. The signals appearing at terminal 40 are respectively coupled to the gate electrodes 26 and 27 of FET's $Q_1$ and $Q_3$ via lines 42 and 28.

Although there are a variety of local oscillator waveforms which may be applied to terminal 36 of hybrid 37 it has been found that a square wave has desirable properties for this purpose and is the waveform used in the preferred embodiment. The square wave tends to switch the FET's between their OFF and ON states very quickly and thereby minimizes the distortion introduced during the transistion between the ON and OFF states of the switching devices. The local oscillator frequency in the preferred embodiment is set at 100kHz. As shown in the preferred embodiment, the local oscillator signal is applied to the mixer 15 in push-pull between lines 31 and 28.

Also included in the preferred embodiment of the mixer 15 are four differential capacitors $C_1$, $C_2$, $C_3$, and $C_4$. Each of the differential capacitors $C_1$–$C_4$ has three main electrodes. One main electrode of each of capacitors $C_1$–$C_4$ is connected to one corner of the quad mixer 15. The other two main electrodes of each differential capacitor $C_1$–$C_4$ are respectively connected to the gate electrodes of the FET's in adjacent arms of the quad configuration. The main electrode of each differential capacitor $C_1$–$C_4$ which is connected to a corner of the quad provides an adjustment for altering the capacitance of each of the differential capacitors $C_1$–$C_{4a}$.

As is shown in the figure the main electrodes of each capacitor which are connected to gate electrodes are connected to opposite phases of the L.O. signal provided at the FET gates via lines 28 and 31. The capacitance of each of differential capacitors $C_1$–$C_4$ is adjusted such that the L.O. voltage which appears at the corners *a, b, c,* and *d* of the quad mixer 15 is a minimum. Since the L.O. voltage at the corners of the quad is a minimum, the gate to source voltage across each of FET's $Q_1$–$Q_4$ is a minimum.

By virtue of the adjustment of capacitors $C_1$–$C_4$, as shown, the L.O. voltage does not use up any of the available operating region of FET's $Q_1$–$Q_4$. Therefore, FET's $Q_1$–$Q_4$ may be operated over a large range of the triode region of their characteristic curves. The effects of distortion generated in the triode region when the FET is in the ON state is therefore minimized.

When the square wave voltage appearing on line 28 is high, FET's $Q_1$ and $Q_3$ are set in their ON state. Since the L.O. signal is applied in push-pull between lines 31 and 28 FET's $Q_2$ and $Q_4$ are in their OFF state at this time. The signals appearing on line 16 are mixed with the L.O. signal on line 28 and the product of the I.F. and the L.O. signal appears on line 43. The product of the I.F. and L.O. signal appearing on line 43 has the same phase, at this time, as the signals on line 16. Simultaneously, the I.F. signal on line 17 is mixed with the L.O. signal through the operation of FET $Q_3$ and the product of the latter two signals appears on line 44 with the phase of the I.F. signal on line 17. Therefore, the product signal on line 44 is similar to the product signal appearing on line 43 except that the two product signals differ by 180°.

Similarly, when the square wave voltage appearing on line 28 is low, during the next half cycle of the square wave, the voltage on line 31 is high. At this time transistors $Q_2$ and $Q_4$ are in their ON state while transistors $Q_1$ and $Q_3$ are in their OFF state. The signals on line 16 are now mixed with the L.O. signal on line 31 and the product of the I.F. and the L.O. signal appears on line 44. The product of the I.F. and the L.O. signal now appearing one line 44 has the same phase as the signals on line 16. Simultaneously, the I.F. signal on line 17 is mixed with the L.O. signal through the operation of $Q_4$ and the product of the latter two signals appears on line 43 with the phase of the I.F. signal on line 17. The product signal on line 44, at this time, is similar to the product signal on line 43 except that the two product signals differ by 180°.

Due to the mixing process taking place in the quad mixer 15, several other product signals also appear on lines 44 and 43. These other product signals are known as intermodulation products. Included in these intermodulation products are signals having frequencies of $2f_1-f_2-f_L$, $2f_2-f_1-f_L$, $f_1-f_2$, $f_1+f_2-2f_L$, and $2f_1$:

where $f_1$ and $f_2$ are the I.F. tone frequencies previously mentioned, and $f_L$ is the frequency of the L.O. signal. The Intermodulation products appear on both lines 44 and 43 with the same phase since they are generated within the mixer 15.

Line 44 is connected to a low pass filter 45. A high pass filter 46 is connected to line 44 via line 47. The desired frequency range at the output terminal of the system is the difference between the I.F. signal frequencies and the L.O. frequency. The low pass filter 45 will pass frequencies in the desired frequency range. Some of the undesired intermodulation products will also fall within the pass band of filter 45.

High pass filter 46 is provided for the purpose of passing signals having a frequency above the desired frequency range such as the sum frequency signals developed by virtue of the mixing of the I.F. and L.O. signals. It is important not to have the sum frequency signals and high order responses reflected back into the mixer 15 where they can generate further spurious products. The high pass filter 46 is therefore terminated in an appropriate dummy load $R_L/2$. When the dummy load $R_L/2$ matches the impedance looking into the mixer output terminal d the signals passed through filter 46 will be absorbed rather than reflected back into the mixer 15.

Similarly, a filter system is coupled to the output terminal c of mixer 15 via line 43. Low pass filter 48 connected to line 43 provides the same function as low pass filter 45. High pass filter 49, terminated in a load $R_L/2$ is connected to line 43 via line 50 and provides the same function as high pass filter 46.

A variable resistor 51 is provided at the output terminal of low pass filter 45 for the purpose of balancing the attentuation in the line comprising low pass filter 45 through output terminal d of mixer 15 and the corresponding switching devices in mixer 15, as compared with the corresponding elements from mixer 15 through output terminal c and low pass filter 48. A resistor having a resistance value of $R_L/2$ is connected to the output terminal of low pass filter 48, and a resistor having a resistance of $R_L/2$ is connected in series with variable resistor 51. The two resistors of value $R_L/2$ in the output lines of filters 45 and 48 respectively connected to terminals 52 and 53 of operational amplifiers 54 and 55. Terminals 56 and 57 of operational amplifiers 54 and 55 are respectively terminated in resistors having a value of $R_L/2$. A feedback resistor $R_3$ is connected across each of the operational amplifiers 54 and 55 in a conventional manner.

A resistor $R_4$ has one terminal connected to output terminal 58 of operational amplifier 54 and input terminal 59 of operational amplifier 60. A resistor $R_5$ has one terminal connected to output terminal 61 of operational amplifier 55 and the other terminal connected to input terminal 62 of operational amplifier 60. A feedback resistor having a value of $R_5$ is connected between input terminal 59 and output terminal 63 of operational amplifier 60. A resistor having a value of $R_4$ is connected between input terminal 62 of operational amplifier 60 and a common or ground terminal.

Operational amplifiers 54 and 55 provide an amplified version of the signals at the output terminals of low pass filters 45 and 48 at amplifier output terminals 58 and 61 respectively. The signals on terminal 58 are provided at the inverting or negative terminal 59 of operational amplifier 60. The amplifier signals at terminal 61 from amplifier 55 are provided at the positive terminal 62 of amplifier 60. Operational amplifier 60 provides signals at output terminal 63 which are the difference between the signals appearing at input terminal 62 and 59.

Since the components of the signals at input terminals 59 and 62 were derived from the difference frequencies of the I.F. and the L.O. signals and vary in phase by 180° with respect to each other, the difference function of amplifier 60 provides the sum of the aforementioned signal components at output terminal 63. The intermodulation products which appear at input terminals 59 and 62 of operational amplifier 60 have the same phase with respect to each other. The difference circuit function has the effect of cancelling or at least substantially reducing the effects of the intermodulation products at output terminal 63.

The variable resistor 51 connected in the output circuit of low pass filter 45 may be adjusted to insure that the amplitude of the intermodulation products arriving at input terminal 59 is equal to the amplitude of the intermodulation products appearing at the input terminal 62. If the amplitude and the phase of the intermodulation products appearing at the input terminals 59 and 62 of operational amplifier 60 are similar the intermodulation products will cancel at the output terminal 63 of amplifier 60.

The signals which appear at output terminal 63 which are substantially free from the effects of intermodulation products may now be processed, for example in a digital signal processor, over a wide dynamic range. Improvements of more than 30db in dynamic range over conventional systems have been obtained when utilizing the present invention in an I.F. frequency translation system.

What is claimed is:

1. A signal translating system for providing an information signal having at least one desired frequency at a system output terminal, said system comprising:

a signal combining means including first, second, third and fourth switching transistors arranged in a quad configuration, said signal combining means having first and second input terminals and first and second output terminals, each of said switching transistors having a switching control input means;

first means for connecting the control input means of said first and third switching transistors at a first junction terminal;

second means for connecting the control input means of said second and fourth switching transistors at a second junction terminal;

means for applying an input signal having at least one frequency tone in push-pull between said first and second signal combining means input terminals;

means for supplying a switching signal in push-pull between said first and second junction terminals;

said signal combining means providing at said first output terminal, in response to said input signal and to said switching signal, a first signal having a first and second component, said first component corresponding to the product of said switching signal and said input signal at a certain phase, said first signal second component corresponding to intermodulation products of said signals, said signal combining means further providing a second signal having first and second components at said second output terminal, said second signal first component corresponding to the product of said switching signal and said input signal with a phase difference of 180° with respect to said certain phase, said second signal second component corresponding to said intermodulation products;

first frequency selective means including a first dummy load coupled to said signal combining means first output terminal for passing signals in a desired frequency range to an output terminal thereof and for absorbing signals in an undesired frequency range in said first dummy load;

second frequency selective means including a second dummy load coupled to said switching means second output terminal for passing signals in said desired frequency range to an output terminal thereof and for absorbing signals in said undesired frequency range in said second dummy load;

first amplifying means coupled to said first frequency selective means output terminal, for providing at an output terminal thereof a first amplified signal;

second amplifying means coupled to said second frequency selective means output terminal, for providing at an output terminal thereof a second amplified signal; and a difference circuit coupled to the output terminals of said first and second amplifying means, for providing said information signal at said system output terminal, said information signal corresponding to the difference between said first signal first component and said second signal first component, said intermodulation products being substantially reduced at said system output terminal.

2. The system according to claim 1 further comprising first, second, third and fourth adjustable differential capacitors each having three main electrodes, one main electrode of each capacitor being connected to a corner junction terminal of said quad configuration, the other two main electrodes of each capacitor being respectively connected to adjacent switching control input means, said capacitors being adjusted to minimize the magnitude of said switching signal at each of said quad corner junction terminals.

3. The system according to claim 1 wherein said switching signal is a square wave.

4. The system according to claim 1 wherein each of said first and second frequency selective means comprises a low pass filter for passing signals in said desired frequency range and a high pass filter terminated in a predetermined dummy load for absorbing the signals in said undesired frequency range.

5. The system according to claim 1 wherein each of said first, second, third and fourth switching devices is a field effect transistor.

6. A system for translating an intermediate frequency signal to a video frequency signal and for providing said video signal at a system output terminal, said intermediate frequency signal having at least one frequency tone, said system substantially reducing intermodulation products, said system comprising:

a mixer having first, second, third and fourth field effect transistors arranged in a quad configuration, said mixer having first and second input terminals and first and second output terminals, each of said field effect transistors having a control electrode;

first means for connecting the control electrodes of said first and third field effect transistors at a first junction terminal;

second means for connecting the control electrodes of said second and fourth field effect transistors at a second junction terminal;

means for applying said intermediate frequency signal in push-pull between said first and second mixer input terminals;

means for applying a switching signal in push-pull between said first and second junction terminals;

said mixer, providing at said first output terminal in response to said intermediate frequency signal and to said switching signal, a first signal having a first and a second component, said first signal first component corresponding to the product of said switching signal and said intermediate frequency signal, said first signal first component having a certain phase, said first signal second component corresponding to said intermodulation products, said mixer further providing at said second output terminal, a second signal having a first and second component, said second signal first component corresponding to the product of said switching signal and said intermediate frequency signal, said second signal first component being 180° out of phase with respect to said first signal first component, said second signal second component corresponding to said intermodulation products;

a first and second filter, each coupled to the first output terminal of said mixer, for passing signals in a desired frequency range through the first filter to an output terminal thereof and for absorbing signals in an undesired frequency range through the second filter, said second filter being terminated in a dummy load;

a third and fourth filter, each coupled to the second output terminal of said mixer, for passing signals in said desired frequency range through the third filter to an output terminal thereof and for absorbing signals in said undesired frequency range through the fourth filter, said fourth filter being terminated in another dummy load;

a first amplifier, coupled to said first filter for providing at an output terminal thereof a first amplified signal corresponding to the signal appearing at the output terminal of said first filter;

a second amplifier, coupled to said third filter, for providing at an output terminal thereof a second amplified signal corresponding to the signal appearing at the output terminal of said third filter; and a differential amplifier, responsive to said first and second amplified signals, for providing at said system output terminal said video signal, said video signal corresponding to the difference between said first signal first component and said second signal first component, said intermodulation products being substantially reduced at said system output terminal.

* * * * *